3,511,314
CEMENTING COMPOSITION AND WELL
CEMENTING PROCESS EMPLOYING SAME
L. J. Scott, Jr., Norman, and Daniel L. Gibson, Fred E. Hook, and Clare H. Kucera, Tulsa, Okla., assignors to The Dow Chemical Company, Midland, Mich., a corporation of Delaware
No Drawing. Filed Oct. 28, 1968, Ser. No. 771,332
Int. Cl. C04b 7/00, 7/12; E21b 33/13
U.S. Cl. 166—293                         4 Claims

ABSTRACT OF THE DISCLOSURE (A) A novel aqueous hydraulic cement slurry comprising hydraulic cement, water, and a turbulence inducing, fluid-loss, control agent consisting of the reaction product of (1) an amino compound selected from the class consisting of polyalkylinepolyamines, polyalkylenimines, and mixtures thereof and (2) an acidic compound selected from the class consisting of carboxylic acids, sulfonic acids, polymers having a carboxyl substituent, and polymers having a sulfonate substituent; and (B) The method of performing cementing operations in geologic formations comprising emplacing said aqueous cement slurry in such formation for bonding and plugging purposes.

---

The invention is concerned with a novel aqueous hydraulic cement composition which exhibits low loss of water to porous media with which it is brought into contact, in a slurry state prior to setting to a solid, and with a method of cementing wherein an aqueous hydraulic cement slurry is brought into contact with porous media, e.g., porous earthen or rock strata. The invention is especially concerned with cementing casings in place in wellbores penetrating such strata, in cementing off water or brine zones in such wellbores, in grouting, and in the construction of cement dikes, dams, and cement-lined tunnels, shafts, and the like.

By the term hydraulic cement as used herein is meant Portland, aluminous, expansive cements containing a high sulfate ingredient (e.g. that described in U.S. Pat. 3,155,526) or Pozzolan cement, or lime, silica or alumina, including cements wherein minor amounts of other than the usual oxides are present, e.g., iron oxide and the like may also be present. By definition, any hydraulic cement is any cement that hardens or sets to a monolithic solid under water and such is the meaning of the term as used herein. Pozzolan cements include slag cements made from slaked lime or granulated blast furance slag. Because of its superior strength portland cements are usually preferred among the hydraulic cements but certain advantages are often gained by the use of other hydraulic cements particularly in admixture with portland cement. The term hydraulic cement also includes minor amounts of extenders such as bentonite or Gilsonite and includes such cements used either without any appreciable sand or aggregate material (such cement usually being referred to as neat cement) or such cements in admixture with granular filling material and/or aggregate including sand, ground limestone, pebbles, and the like.

Hydraulic cements are customarily admixed with water and used as aqueous slurries. The amount of water employed may vary rather extensively depend largely upon the fluidity of the slurry required and upon the ultimate strength properties necessary. Too little water tends to result in non-uniform mixing which leads to a final product having weak spots as well as to difficulties of pumping such low-water slurries. On the other hand, an excessive amount of water results in handling and emplacing of additional bulk of slurry and in an impairment of the ultimate strength properties of the cement when set. The amount of water usually employed is that which permits relatively easy pumping and yet results in a set cement of adequate strength. The proportion of hydraulic cement to water may be between 25 and 120. Usually the proportion of water to hydraulic cement in an aqueous hydraulic cement slurry is between about 30 and 100 parts by weight of water per 100 parts by weight of the cement and more commonly between about 40 and 50 parts of water per 100 parts of cement.

In a great many uses of an hydraulic cement, it is necessary for the cement slurry to be emplaced within or next to a porous medium particularly earthen strata, e.g., in cementing off wellbores, grouting, and in constructing dams and tunnels. When such is the case, water filters out of the slurry into the strata during the setting period. When this occurs to any marked extent, there usually results an uncontrolled setting rate, improper placement, impaired strength properties, and usually a contamination of the surrounding strata. All of these undesirable conditions are especially to be avoided in cementing operations associated with oil, gas, water, or brine wells.

Efforts have been made to lessen the loss of fluid from an aqueous cement slurry into adjacent porous media, particularly by admixing with the aqueous cement slurry a fluid-loss control agent. However, in most instances the use of a known additive for this purpose has been accompanied by one or more undesirable effects such as excessive retardation or acceleration of the setting rate, incompatibility of the additive with other cement additives present, precipitation of the cement prior to set, and lessening of the ultimate physical properties of the set cement. In some instances, otherwise acceptable fluid-loss control additives for aqueous cement slurries have not provided an answer to the problem because of economic scarcity or cost of the additive.

A need therefore exists for an efficient and economical additive and method of use for inhibiting the loss of fluid from aqueous hydraulic cement slurries to porous media with which it comes into contact. The invention meets this need by providing an aqueous cement composition that remians pumpable until it has all been emplaced, sets at a substantially uniform rate to a substantially uniform solid, and has ultimate high strength values.

The invention encompasses:

(A) A novel aqueous hydraulic cement slurry comprising hydraulic cement, water, and a turbulence inducing, fluid-loss, control agent consisting of the reaction product of (1) an amino compound selected from the class consisting of polyalkylinepolyamines, polyalkylenimines, and mixtures thereof and (2) an acidic compound selected from the class consisting of carboxylic acids, sulfonic acids, polymers having a carboxyl substituent, and polymers having a sulfonate substituent; and (B) the method of performing cementing operations in geologic formations comprising emplacing said aqueous cement slurry in such formation for bonding and plugging purposes.

The proportions of the composition of the invention by weight are 100 parts of an hydraulic cement, from 30 to 100 parts of water, and from 0.1 and about 5.0 parts of said reaction product. The amount of water is usually between about 40 and 65 parts but, due to the lessened tendency to lose water during the setting periods, lower proportions of water may be employed in the invention for special purposes. Between about 0.5 and 3.0 parts of the reaction product are usually employed.

The presence of said reaction product induces into the cement slurry a property which permits the slurry to become turbulent at a lower velocity than that at which it will become turbulent when containing the reaction product. High turbulence (that is a flow exhibiting eddies and swirling rheological patterns) is much preferred, when emplacing hydraulic cement slurries, over laminar flow, and particularly over slug or plug flow, because turbulence results in superior bond between the set cement and the formation. Generally speaking, any fluid can be put into turbulent flow while being moved through a conduit, but there is a vast difference among fluids in the velocities necessary to achieve this condition in a given conduit. High velocity pumping necessitates higher pumping costs. Accordingly, achieving turbulence at lower pumping rates is highly desirable in cementing operations.

The following discussion adds further to the understanding of this concept. It has been shown that primary cement jobs can be improved if the cement slurry displaces the mud at such a pump rate that the cement slurry is in upper laminar or turbulent flow.

Cement slurries and drilling muds are plastic fluids. Plastic fluids have three regions of flow:

(1) Plug, (2) laminar or streamline, (3) turbulent.

At a plug flow, the fluid moves through the pipe as a solid plug. When the plastic fluid is in laminar flow, the slurry moves as a central plug with a drag near the sides of the pipe. Turbulent flow of a plastic fluid is characterized by eddies throughout the body of fluid as it is moved through the pipe.

PLASTIC FLOW THEORY

Drilling muds and cement slurries are considered to be Bingham plastic fluids when calculating flow properties. A Bingham plastic fluid can be defined as a fluid whose viscosity is not constant but varies with different rates of shear. When a force is applied to a Bingham plastic fluid, the fluid will remain static until the force builds up to a certain value called the yield point. In our calculations this value is designated $ty$ and is measured as pounds per square foot. After the fluid has started to move the velocity increase is proportional to the increased force. The velocity-force or shear/stress gradient is called the coefficient of rigidity. This coefficient of rigidity is designated as "$n$." and is measured in pounds per second-foot. The coefficient of rigidity is also a measure of the apparent viscosity of the Bingham plastic fluid. To change the coefficient of rigidity to viscosity in centipoise multiply "$n$" by 1488.

APPARATUS-LABORATORY

The flow properties of a Bingham plastic fluid are measured by a Fann V-G meter, Model 35. The Fann V-G meter is a rotational viscometer. Fluid is contained in the annular space between the two coaxial cylinders.

Turbulent flow may be ascertained by calculating the coefficient of rigidity (designated $n$) and yield value (designated $ty$) from the Fann Viscometer values by the prescribed procedure of the Fann Instrument Corporation, 3202 Argonne, Houston, Tex. The coefficient of rigidity is expressed in pounds per second-foot and tensile value is expressed in pounds per square foot. The viscometer employed is the Model 35 Fann Rotational Viscometer as aforesaid. To determine these values by the use of the viscometer, the cement is dry mixed in accordance with the procedure in API RP 10B. The dry cement is then made into a slurry, employing the proportions of cement and water specified in Section 2, Table 2.2 of API RP 10B, e.g., 46 parts of water per 100 parts of dry Class A cement by weight, and is immediately transferred to the Fann sample cup. The instrument reading of the Fann Viscometer is then ascertained at a speed of 600 revolutions per minute (r.p.m.). After the reading has become stabilized at the 600 r.p.m. speed, the instrument is adjusted to 300 r.p.m. and the reading again recorded after the value becomes stabilized at that speed. The rigidity ($n$) and the yield value ($ty$) are calculated as follows:

$$n = N(600 \text{ reading} - 300 \text{ reading})(0.000672)$$

$$ty = N \left[ \frac{300 \text{ reading} - (600 \text{ reading} - 300 \text{ reading})}{100} \right]$$

N = in the above equations is the extension factor of the torque spring of the instrument. This is a value for each instrument and is a part of the direction for use of the invention obtainable from the Fann Company.

Briefly, the higher the $ty$ ratio, the less tendency the slurry shows toward turbulent flow at a specified rate of flow.

Turbulent flow is readily calculated for an aqueous cement slurry by the following procedure: The following values are obtained or measured: The diameters of the borehole; the outside diameter of the pipe through which the slurry will be injected into the well; the density of the slurry in pounds per gallon; the coefficient of rigidity ($n$) in pounds per second-foot; and the yield value in pounds per square foot ($ty$). The $n$ and $ty$ values are calculated from the Fann values as herein described. The critical pump rate at which laminar flow becomes turbulent flow is then calculated according to the equation:

$$PR_c = 140(D_h + D_p) \left[ n \sqrt{\frac{n^2 + (D_h - D_p)^2 ty a}{2690}} \right]$$

where:

$PR_c$ is the critical pump rate in barrels per minute.
$D_h$ is the diameter of the borehole in inches.
$D_p$ is the outside diameter of the pipe in inches.
$a$ is the density of the slurry in pounds per gallon.
$n$ is the coefficient of rigidity in pounds per second-foot.
$ty$ is the yield value in pounds per square-foot.

An acid, identified as component (2) of the aqueous hydraulic cement slurry above, which we have found most useful for accomplishment of the objective of the invention is the condensation product of mononaphthalene sulfonic acid and formaldehyde. This condensation product usually has a molecular weight of between about 1,000 and 3,000 commonly between about 1,500 and 2,000. The amino compound, identified as component (1) above, usually has a molecular weight of between about 60 and 500,000.

Said amino compound employed in the practice of the invention may be prepared according to any one of a number of known procedures. Methods of preparing polyalkylenimines are described in the section entitled "Polymerization of Olefin Imines" by G. D. Jones, pages 521–534, in The Chemistry of Cationic Polymerization, edited by P. H. Plesch, published by MacMillan Co. (1963). Other methods of preparing the required amine compound are described in U.S. Pats. 2,595,935 and 2,694,633. Preferred procedures to employ to make either (1) the polyalkylenimines of (2) the preferred polyalkylenepolyamines consisting of the polymeric condensate of polyalkylenepolyamines and vicinal dihaloalkanes are described in application Ser. No. 208,117, filed July 6, 1962 by Garms et al. now U.S. Pat. No. 3,210,308, issued Oct. 5, 1965.

The general method of preparing the polyalkylenimines therein described comprises: (1) mixing together an alkylenimine, a vicinal dihaloalkane as a catalyst or initiator, and alkali metal salt and a solvent and (2) heating the continuously stirred mixture to accelerate polymerization of the alkylenimine monomer, and subjecting the reaction mixture to a shearing force during the polymerization reaction period. The alkylenimines most commonly polymerized are ethylenimine and propylenimines.

The general method of preparing the higher molecular weight polyalkylenepolyamines is to react one or more polyalkylenepolyamines with a vicinal dihaloalkane as described in said application which comprises mixing together a solution of a polyalkylenepolyamine a vicinal dihaloalkane, and an alkali metal salt, (2) heating the mixture while it is continuously stirred and (3) subjecting the recation mixture to a shearing force as in the preparation of the polyalkylenimines, during the reaction period.

In the above general methods, the solvent employed is water, a water-soluble alcohol or a mixture thereof. The vicinal dihaloalkane contains from 2 to about 6 carbon atoms and the halogen substituents are bromine, chlorine or a combination thereof. In the preparation of polyalkylenimines the dihaloalkane is employed as an initiator in an amount equal to from about 1.0 to 4.5 weight percent of the alkylenimine. In the preparation of polymeric condensates, the dihaloalkane is employed as a reactant in an amount equal to about 15 to 25 weight percent of the polyalkylenepolyamine starting material. The said reaction product described as a reaction of (1) and (2) above can be produced by adding an acid described in (1) to an amino compound described in (2) accompanied by vigorous agitation and employing a cooling means (to compensate substantially for exothermic heat of reaction) until one equivalent weight of acid of (1) has been added for each equivalent weight of nitrogen in the amino compound (2).

The following examples are illustrative of the invention.

Series one

Tetraethylene pentamine was admixed and reacted with the condensation product of mononaphthalene sulfonic acid and formaldehyde prepared by the procedure herein above described. The resulting product, in the amounts stated in Table I below, was then admixed with water and Class A portland cement in proportion by weight of 46 parts of water and 100 parts of cement. The fluid loss of the resulting aqueous cement slurry was then ascertained at 1,000 p.s.i.g. according to API RP 10B 13th ed. (March 1964) Section 5. The results of the tests are also shown in Table I. The rheological measurements were also conducted according to API RP 10B Thirteenth Edition March 1964 section 10.

TABLE I

API Class A cement in admixture with the tetraethylene pentamine salt of formaldehyde condensed napthalene sulfonic acid.

| | | 80° F. | | 144° F. | |
|---|---|---|---|---|---|
| Additive in percent by dry wt. of cement | Slurry wt. in lbs./gal. | Yield value in lbs./ft.³ | Fluid loss in cc./30 min. at 1,000 p.s.i. | Yield value in lbs./ft.³ | Fluid loss in cc./30 min. at 1,000 p.s.i. |
| 0 | 15.6 | 0.32 | 1,230 | 0.28 | 1,320 |
| 1.5 | 15.6 | 0.001 | 22 | 0.002 | 27 |
| 1.3 | 15.6 | 0.001 | 48 | 0.002 | 54 |
| 1.3 | 16.3 | 0.002 | 36 | 0.005 | 74 |
| 1.3 | 16.8 | 0.008 | 30 | 0.01 | 69 |
| 1.3 | 17.4 | 0.04 | 21 | 0.04 | 54 |

API Class E cement in admixture with the tetraethylene pentamine salt of condensed napthalene sulfonic acid.

| | | 200° F. | |
|---|---|---|---|
| Concentration of reaction product in percent by dry wt. of cement | Slurry weight in lbs./gal. | Yield value in lbs./ft.³ | Fluid loss in cc./30 min. at 1,000 p.s.i. |
| 0 | 16.3 | 0.36 | 1,280 |
| 1.5 | 16.3 | 0.001 | 118 |
| 1.5 | 16.8 | 0.006 | 96 |
| 1.5 | 17.4 | 0.02 | 72 |

Reference to Table I shows that both the yield value and the fluid loss are very definitely reduced in an aqueous hydraulic cement slurry employing in the slurry the additive prepared by reacting (1) an organic acid as exemplified by the reaction product of HCHO and napthalene sulfonic acid and (2) a polyamine as exemplified by tetraethylenepentamine.

Series two

The tests of Table I were repeated, except that other acids than formaldehyde condensed sulfonic acid were employed with tetraethylenepentamine, as set out in Table II, infra.

TABLE II

API Class A cement in admixture with the tetraethylene pentamine salts of different acids. Tests were at 80° F.

| Acid reacted with the amine | Concentration of reaction product in percent by dry wt. of cement | Slurry wt. in lbs./gal. | Fluid loss in cc./30 min. at 1,000 p.s.i. |
|---|---|---|---|
| Comparative run (no additive) | | 15.6 | 1,230 |
| Oxalic | 1.5 | 15.6 | 230 |
| P-toluene sulfonic | 1.5 | 15.6 | 246 |
| Ethylene diamine tetraacetic | 1.5 | 15.6 | 420 |
| Citric | 1.5 | 15.6 | 45 |

Reference to Table II shows that the fluid loss was very effectively reduced by the practice of the invention when employing various organic acids to prepare the reaction product subsequently admixed with the hydraulic cement slurry.

Series three

A third series of tests was run to illustrate the use of different amine salts to prepare the reaction product for use in accordance with the practice of the invention. The acid employed to prepare the reaction product additive was the condensation product of formaldehyde and naphthalene sulfonic acid. The tests were otherwise conducted as in Series one and two. The results are shown in Table III.

The polyethylene polyamines were prepared in accordance with the procedure described in U.S. Pat. No. 3,210,308. Specifically, reference is made to column 5, line 20 through column 6, line 33 of said patent.

TABLE III

[API Class A cement with different amine salts of formaldehyde condensed naphthalene sulfonic acid. Tests at 80° F.

| The amine reacted with the acid component of the additive | Concentration of reaction product in percent by wt. of cement | Slurry wt., lbs./gal. | Fluid loss, cc./30 min. 1,000 p.s.i. |
|---|---|---|---|
| Comparative run (no additive) | | 15.6 | 1,230 |
| Tetraethylene pentamine | 1.5 | 15.6 | 22 |
| Triethylene tetramine | 1.5 | 15.6 | 82 |
| Cyclohexylamine | 1.5 | 15.6 | 130 |
| Dicyclohexylamine | 1.5 | 15.6 | 93 |
| Polyethylene polyamine M.W. ≈30,000 | 1.5 | 15.6 | 84 |
| Polyethylene polyamide M.W. ≈150,000 | 1.5 | 15.6 | 159 |

Table III shows that amine salts in general when reacted with formaldehyde-condensed naphthalene sulfonic acid reduce the water loss from aqueous class A cement slurries very effectively.

Having described our invention, what we claim and desire to protect by Letters Patent is:

1. An aqueous hydraulic cement composition settable to a solid mass comprising by weight (1) 100 parts of a hydraulic cement, (2) between about 30 and about 100 parts of an aqueous liquid selected from the class consisting of water and brine, (3) a fluid loss control and turbulence inducing agent in an amount between about 0.1 and about 5.0 parts, consisting of the reaction product consisting of a salt comprising the reaction of about an equivalent weight of nitrogen in an amino compound selected from the class consisting of polyalkylene polyamine, polyalkalenimines and mixtures thereof and about an equivalent weight of a sulfonic acid.

2. The composition of claim 1 wherein said fluid loss control and turbulence-inducing agent is the reaction product of tetraethylene pentamine and the condensation product of HCHO and mononaphthalenesulfonic acid in an amount between about 1 and 3 parts, by dry weight of the hydraulic cement present.

3. The method of cementing a well penetrating a porous geologic formation comprising injecting the composition of claim 1 down the well, in a state of turbulence at a rate of injection which is less than that of a slurry of the cement and aqueous liquid above which would be necessary to attain turbulence, and emplacing it therein at the desired level of the formation wherein loss of fluid to the formation is reduced, and causing the so emplaced slurry to set to a monolithic solid mass.

4. The method of cementing a well penetrating a porous geologic formation comprising injecting the composition of claim 2 down the well, in a state of turbulence at a rate of injection which is less than that of a slurry of the cement and aqueous liquid above which would be necessary to attain turbulence, and emplacing it therein at the desired level of the formation wherein the loss of fluid to the formation is reduced, and causing the so emplaced slurry to set to a monolithic solid mass.

References Cited

UNITED STATES PATENTS

| | | | |
|---|---|---|---|
| 2,614,634 | 10/1952 | Lea et al. | 166—22 |
| 2,690,975 | 10/1954 | Scripture | 106—90 |
| 2,860,060 | 11/1958 | Benedict et al. | 106—90 |
| 2,927,033 | 3/1960 | Benedict et al. | 106—90 |
| 3,234,154 | 2/1966 | Martin | 260—17.5 |
| 3,277,162 | 10/1966 | Johnson | 106—90 |
| 3,359,225 | 12/1967 | Weisend | 260—29.6 |

FOREIGN PATENTS 893,911 4/1962 England.

TOBIAS E. LEVOW, Primary Examiner

W. T. SCOTT, Assistant Examiner

U.S. Cl. X.R.

106—90, 95, 314; 166—294